United States Patent [19]

Lundgren

[11] 4,434,374
[45] Feb. 28, 1984

[54] DEVICE FOR GENERATING ELECTRICITY BY PEDESTRIAN AND VEHICULAR TRAFFIC

[76] Inventor: Roy L. Lundgren, 1360 NE. 48 Ct., Ft. Lauderdale, Fla. 33334

[21] Appl. No.: 309,276
[22] PCT Filed: Sep. 14, 1981
[86] PCT No.: PCT/US81/01235
    § 371 Date: Sep. 14, 1981
    § 102(e) Date: Sep. 14, 1981
[87] PCT Pub. No.: WO83/01158
    PCT Pub. Date: Mar. 31, 1983

[51] Int. Cl.³ .......................... F04B 9/14; F04B 35/06
[52] U.S. Cl. ..................................... 290/1 R; 417/1 R
[58] Field of Search ................. 290/1 R; 340/31 R; 404/10, 11; 417/229

[56] References Cited

U.S. PATENT DOCUMENTS

| | | | |
|---|---|---|---|
| 1,538,952 | 5/1925 | Ram | 340/31 R |
| 1,665,140 | 4/1928 | Master | 290/53 |
| 1,745,944 | 2/1930 | Morton, Jr. | 340/31 R |
| 1,771,200 | 7/1930 | Akers | 417/229 |
| 1,773,718 | 8/1930 | Barney | 340/31 R |
| 1,916,873 | 7/1933 | Wiggins | 290/1 R |
| 2,020,361 | 11/1935 | Johnston | 417/229 |
| 2,164,177 | 6/1939 | Jones | 340/31 R |
| 2,384,110 | 9/1945 | Malmquist | 280/217 |
| 3,918,844 | 11/1975 | Bailey | 417/229 |
| 4,212,598 | 7/1980 | Roche et al. | 417/229 |

Primary Examiner—J. V. Truhe
Assistant Examiner—Shelley Wade

[57] ABSTRACT

The present invention provides an improved device for capturing and converting energy expended by pedestrian or vehicular traffic. In one embodiment, the device comprises a tread plate (34) having an elongated generally channel formed member having a top web with downwardly extending side walls (36) with inwardly directed flanges (40) which mates with a base member (54) having a channel formed member defining a base web with upstanding side walls (52) of a common height which terminate at outwardly directed flanges, (56) the tread plate in mating telescopic engagement with the base enabling relative vertical movement of the tread plate. The base web includes a plurality of supports (70) stamped therefrom, each of the supports having an aperture therein, all of the apertures in axially alignment. A rocker arm shaft (80) is rotatably mounted to each of the supports and carries a plurality of rocker arms (201) mounted by one way clutches (100). The rocker arms are upwardly biased by resilient tabs (301) spot welded to the base web. The rocker arms are spaced so that at least two rocker arms are depressed whenever weight is exerted on the tread plate. The design of the tread plate enables the rocker arms to depress even when downward force is applied around the outer periphery of the tread plate. The shaft is connected to a gear generator device (97) by way of a torque energy storage device (80b) so that torque energy insufficient to initially turn the gear generator will be stored and utilized whenever possible. The design of the improved device enables the device to be manufactured and assembled in a much more time saving and economic manner.

3 Claims, 8 Drawing Figures

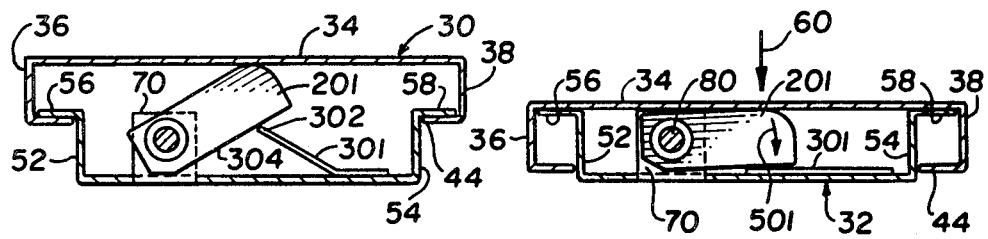
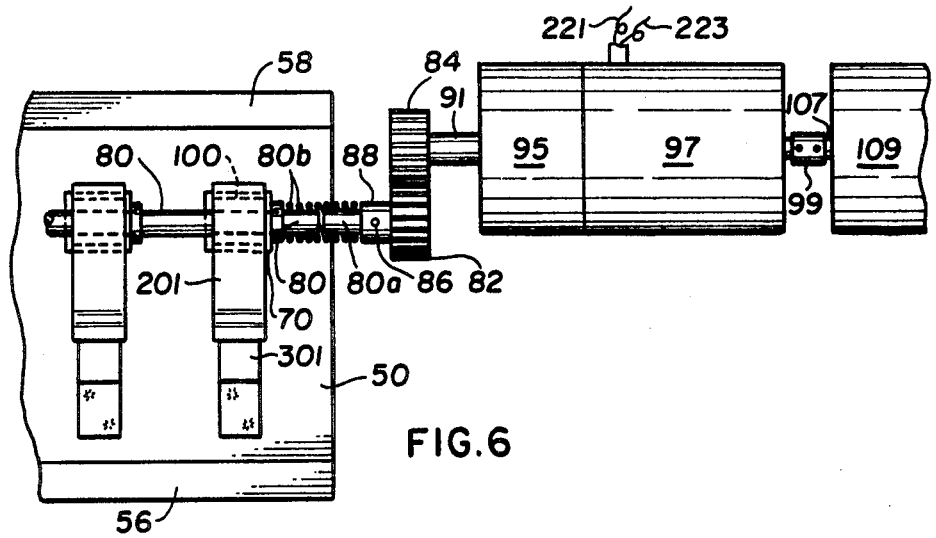
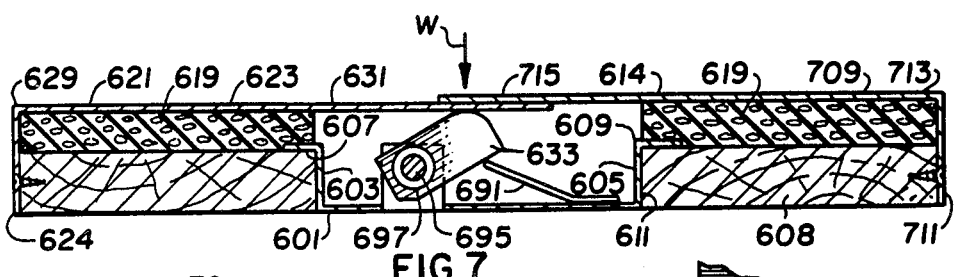
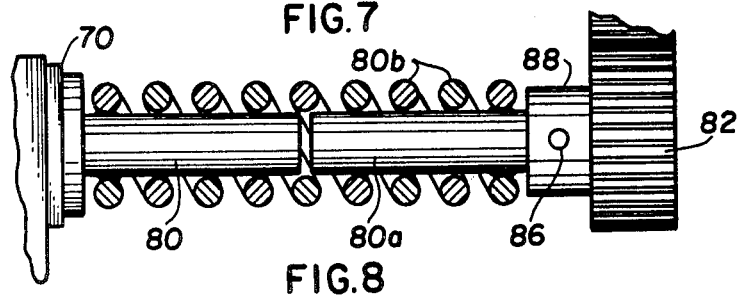

DEVICE FOR GENERATING ELECTRICITY BY PEDESTRIAN AND VEHICULAR TRAFFIC

TECHNICAL FIELD

This invention relates to an improved device for generating electricity and utilizing vehicular traffic or pedestrian traffic so that the weight of the moving traffic is utilized to generate electricity by rotating a generator shaft through a mechanism to be described more fully hereinafter.

BACKGROUND ART

This invention is an improved structure for carrying out the concept disclosed in my earlier granted U.S. Pat. No. 4,250,395. That earlier U.S. patent disclosed a device which captured energy expended by pedestrian or vehicular traffic and included a plurality or tread plates which were depressed by traffic thereover to rotate a shaft through depression of rocker arms mounted to the shaft by one-way clutches. The rocker arms are normally spring-biased to a first position yet yieldable in response to the weight to movement downwardly so that the shaft, which is connected to a generator, is rotated to convert the mechanical energy into electrical energy. That structure described in U.S. Pat. No. 4,250,395 included a plurality of tread plates. This invention is of an improved tread plate means and general overall structure which is relatively simple to manufacture and assemble and constitutes an improved structure for accomplishing the use of vehicular or pedestrian traffic to convert the mechanical energy of the traffic to electrical energy.

DISCLOSURE OF THE INVENTION

In the earlier patent described above, a base or support was provided for the shaft and rocker arms connected to it by one-way clutch means and which support was beneath a tread plate. That structure was relatively difficult to manufacture and assemble. The present invention provides an improved structure for the base and the tread plate as well as other improved components as is described more fully hereinafter.

The base of the instant invention comprises a channel-form member with the upstanding standards in spaced relation from one another and with holes therethrough to accommodate the shaft and, spot welded at spaced locations along the web a plurality of spring steel members to normally urge rocker arms connected to the shaft by one-way clutch means into a first normal position yet yieldable in response to the weight of traffic passing over it to permit rotation of the shaft as the rocker arms are displaced.

It is an object of this invention to provide an improved device of the type described which comprises a base of channel form having spaced upstanding side walls of equal height on opposite sides of a web and which side walls terminate in outturned flanges or ears which intercooperate with a generally channel-form member tread plate and wherein upstanding standards are struck from the web so as to provide a simple inexpensive construction.

It is another object of this invention to provide an improved tread plate wherein the plate is provided with a weakened or flexible zone so that a portion of the tread plate is adapted to respond to the application of weight to it to downward movement so that this downward movement can be transmitted through the rocker arms and one-way clutch means to rotate a shaft and thereby generate electricity from the traffic.

In accordance with these and other objects which will become apparent hereinafter, the instant invention will now be described with reference to the accompanying drawings in which:

BRIEF DESCRIPTION OF THE DRAWINGS

FIG. 4 is a vertical cross section of the apparatus shown in FIGS. 2 and 3, with the tread plate and rocker arm in normal non-depressed position;

FIG. 5 is a vertical cross section of the apparatus shown in FIGS. 2 and 3, with the tread plate and rocker arm in the depressed position;

FIG. 6 is a partial top view of FIG. 3 further illustrating the shaft in driving engagement with interconnected generators;

FIG. 7 is a vertical cross section of the device shown in FIG. 1;

FIG. 8 is a partial side elevational view of the torque storage device of FIG. 7.

BEST MODE FOR CARRYING OUT THE INVENTION

Figure 1:
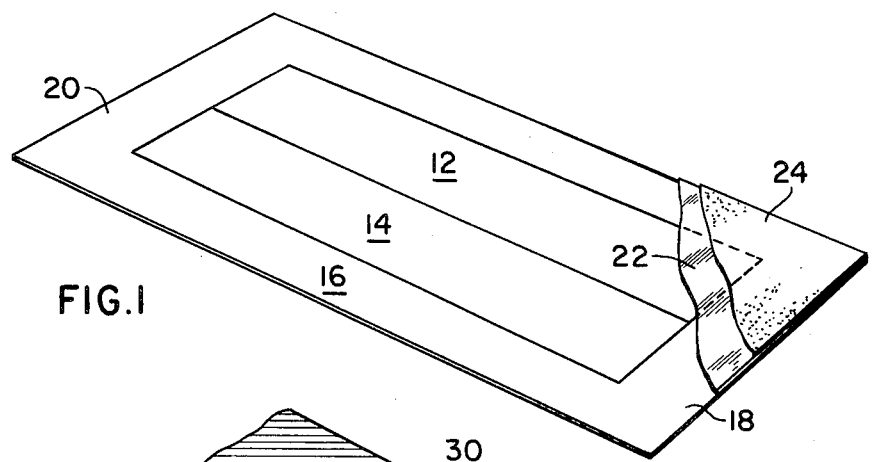
FIG. 1 is a perspective view of one embodiment of the tread plate of the present invention.
Figure 2:
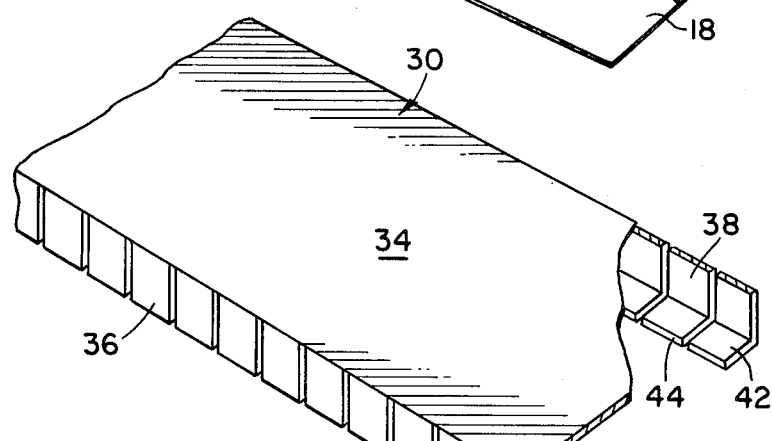
FIG. 2 is a partial perspective view of another embodiment of a tread plate of the present invention.

Referring now to the drawings wherein like reference characters designate like or corresponding parts throughout the several views and referring more particularly to FIGS. 1 and 7, it is seen that there is a first tread plate portion 12 for generating electricity by pedestrian or vehicular traffic in side-by-side overlapping relation with a second tread plate portion 14. In the following description, only the device illustrated by the numeral 12 will be described, it being understood that the device designated by the numeral 14 is similar.

The devices, irrespective of the number to be utilized, are preferably provided with a ramp 16 about it such which may be provided with a smooth contour at the opposite ends 18 and 20. The apparatus may be covered with a plastic sheet 22 to keep out dirt and debris. The entire apparatus may be covered with a carpet designated by the numeral 24 to disguise its location.

As shown in FIG. 7, the base 601 has upstanding legs 603 and 605 which are outturned defining flanges 607 and 609. These flanges dwell in a recessed platform or frame 608, the base being nested in the recess 611. A resilient pad 619 of cushioning material, such as foam rubber is provided in overlaying relation of the frame 608 and about the base 601. The angled member 621 are secured to the base by screws or other suitable connecting means. The horizontal leg 623 and a vertical leg 624 of the angled member 621 are bendable with respect to a zone of juncture 629 so that the cantilevered portion 631, which extends over the rocker arm 633 is adapted to yield in response to a downwardly exerted force or weight W. Similarly, on the opposite side, the angled member 709 is connected to the base by screws or other suitable connecting means. The top portion 713 includes a portion 715 extending into the central zone over the rocker arm 633 and in overlapping relation with the cantilevered portion 631. The horizontal leg 713 and the vertical leg 711 of the angled member 709 are bendable with respect to each other at their juncture in order to actuate the rocker arm 633 in response to the downward force W. The spring 691 restores the depressed rocker arm 633 to a non-depressed position when the downward force W is removed. As weight is applied (even if on the outer periphery of the tread plate) the shaft 695 rotates as permitted by the one-way clutch 697.

Figure 3:
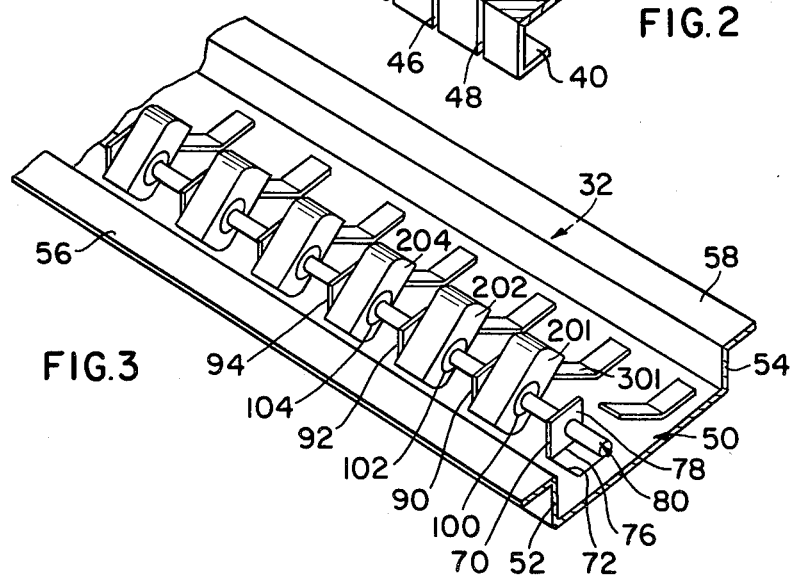
FIG. 3 is a partial perspective view of rocker arms mounted on a torque transmitting shaft, connected to the base of the present invention.

Referring now to FIGS. 2, 3, 4 and 5, in another embodiment of the invention a tread plate 30 is operatively connected for telescopic vertical movement relative to the matingly sized base 32. The tread plate 30 includes an elongated generally channel-form member having a top plate zone or web 34 with downwardly extending side walls 36 and 38 having the distally inturned feet 40 and 42. The side walls 36 and 38 as well as the feet 40 and 42 are provided with a plurality of parallel slots 46 and 48 therealong extending from the terminal end 44 to the plane of the web 34. The base 32, see FIG. 3, is also composed of a channel-form member defining a web or bottom zone 50 with upstanding side walls 52 and 54 of a common height which terminate at outturned flanges 56 and 58. The base 32 and the tread plate 30 are sized for mating generally telescoping type movement in relation to one another. It will be appreciated that in response to a downwardly directed force, as indicated by the arrowed line 60 (FIG. 5), the tread plate 30 will move downwardly relative to the base 32, as guided by the terminal ends 44 of the feet or flanges in engagement with the side walls 52 and 54 of the base. It is this movement which is utilized by the apparatus to be described below.

Extending longitudinally through the space 70 defined by the base there is a shaft 80 which is rotatable with respect to upstanding supports such as that designated by the numeral 70. The standards or supports 70 are each struck from the bottom as is the one indicated by the line 72, so as to define a bent portion at 76 with a hole 78 being provided in each upstanding standard. The standards are aligned with one another and each is provided with a hole to accommodate rotation of the shaft 80. A plurality of the standards, such as 78, 90, 92, 94 are provided in spaced relation. Adjacent each support a one-way clutch is provided, such as those designated by the numeral 100, 102, and 104. Keyed to each of these one-way clutches there is a rocker arm, such as 201, 202 and 204. The rocker arms are biased by spring means 301 and which has a terminal end 302 at all times in engagement with a surface 304 of the rocker arm.

In operation, when the tread plate 30 is moved downwardly from the position shown in FIG. 4 to the position shown in FIG. 5, more than one of the rocker arms will rotate in the direction of the arrowed line 501 storing energy in the spring 301 and simultaneously, rotating the shaft 80 in the same direction. Thereafter, when the weight as indicated by the arrowed line 60 is removed, the energy stored in the spring will restore the rocker arm to its normal position, that is the position shown in FIG. 4.

Referring now to FIGS. 6 and 8 the shaft 80 is connected to the shaft 80a by the spring 80b, the spring 80b having one end brazed to the shaft 80 and the other end brazed to the shaft 80b. The shaft 80b is connected by pin 86 and bushing 88 to the gear 82. The gear 82 meshes with the gear 84 (attached to the shaft 91 in the same manner as gear 82 is connected to the shaft 80a) and thus rotation (of sufficient torque) of the shaft 80 will ultimately result in rotation of the shaft 91 and production of electricity by the generators 97 and 109. The shaft 91 may be connected by coupling means 99 (such as a pin or bushing) to a similar shaft 107 of a second generator 109. There are electrical output leads provided such as 221 and 223 to connect to a battery, for example, to store the energy. The spring 80b enables rotational energy of insufficient torque to rotate the generator shaft 91, to be stored for future use, such as when the traffic weight is insufficient to create the threshold torque of the generator.

It is thus seen that in response to the weight of vehicular traffic or pedestrian traffic moving over the tread plate concealed beneath the carpet it will move downwardly in the zone beneath the weight and, in so doing, cause the shaft to turn generating electricity. The weakened walls permit a flexing and bending response to the weight so that with each step, as weight is applied it causes the rocker arms beneath the weight to rotate the shaft. When this happens energy is stored in the spring or springs involved which will restore the affected rocker arms to the normal position when the weight is released. In this manner, substantial amounts of electricity can be produced and utilized.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

INDUSTRIAL APPLICABILITY

The present invention can be sold commercially in unitary form or disassembled form for installation at desired locations.

What is claimed is:

1. A device for generating electricity by utilizing the weight of pedestrian and vehicular traffic flow and to recoup energy from the traffic flow comprising:
   a base having a generally channel-formed member defining a base web and spaced upstanding walls of equal height each terminating at outwardly directed flanges and a frame portion extending outwardly from said spaced upstanding walls;
   a plurality of spaced apart, parallel support means formed from and integral with said base web and perpendicular thereto, each said support means having an aperture therein, said apertures in coaxial alignment;
   a shaft means for transmitting torque rotatably mounted in said apertures;
   a tread plate having at least a first and a second angled member, each angled member having a downwardly extending portion and a horizontally extending portion, said horizontally extending portions being in overlapping relation with respect to one another, said first and second angled members operably connected to said frame portion;
   said tread plate operably engaged with said base for relative vertical movement therebetween;
   rocker arm means in tangential engagement with said tread plate for following movement of said tread plate;
   biasing means for biasing said rocker arm means upwardly into engagement with said tread plate, said biasing means connected to said base web;

one-way clutch means for movably connecting said rocker arm means to said shaft means, said clutch means engaging said shaft means upon downward movement of said rocker arm means causing rotation of said shaft means and disengaging said shaft means upon upward movement of said rocker arm means;

energy means for storing or converting mechanical energy to electrical energy;

connecting means for connecting said shaft means to said energy means, said connecting means storing energy insufficient to activate said energy means until said energy means is activated.

2. The device as set forth in claim 1, further comprising a resilient cushioning means for dampening movement of said tread plate, said cushioning means captivated between said frame portion and said first and second angled members.

3. A device for generating electricity by utilizing the weight of pedestrian and vehicular traffic flow and to recoup energy from the traffic flow comprising:

a base having a generally channel formed member defining a base web and spaced upstanding walls of equal height each terminating at outwardly directed flanges, a plurality of spaced apart, parallel support means formed from and integral with said base web and perpendicular thereto, each said support means having an aperture therein, said apertures in coaxial alignment;

a shaft means for transmitting torque rotatably mounted in said apertures;

a tread plate having a generally channel-formed member defining a tread plate web with a pair of downwardly extending side wall portions each terminating at inwardly directed flanges, said tread plate operably engaged with said base for relative vertical movement therebetween; rocker arm means in tangential engagement with said tread plate following movement of said tread plate;

biasing means for biasing said rocker arm means upwardly into engagement with said tread plate, said biasing means connected to said base web;

wherein:

each said inwardly directed flange extending an equal distance from said side wall portion, each said inwardly directed flange in sliding engagement with a respective side wall of said support means and said outwardly directed flanges in sliding engagement with a respective downwardly extending side wall portion of said tread plate.

* * * * *